Jan. 16, 1962 M. STERNBERG ET AL 3,016,697
ROCKET ENGINE SWIVEL MOUNT
Filed June 19, 1959
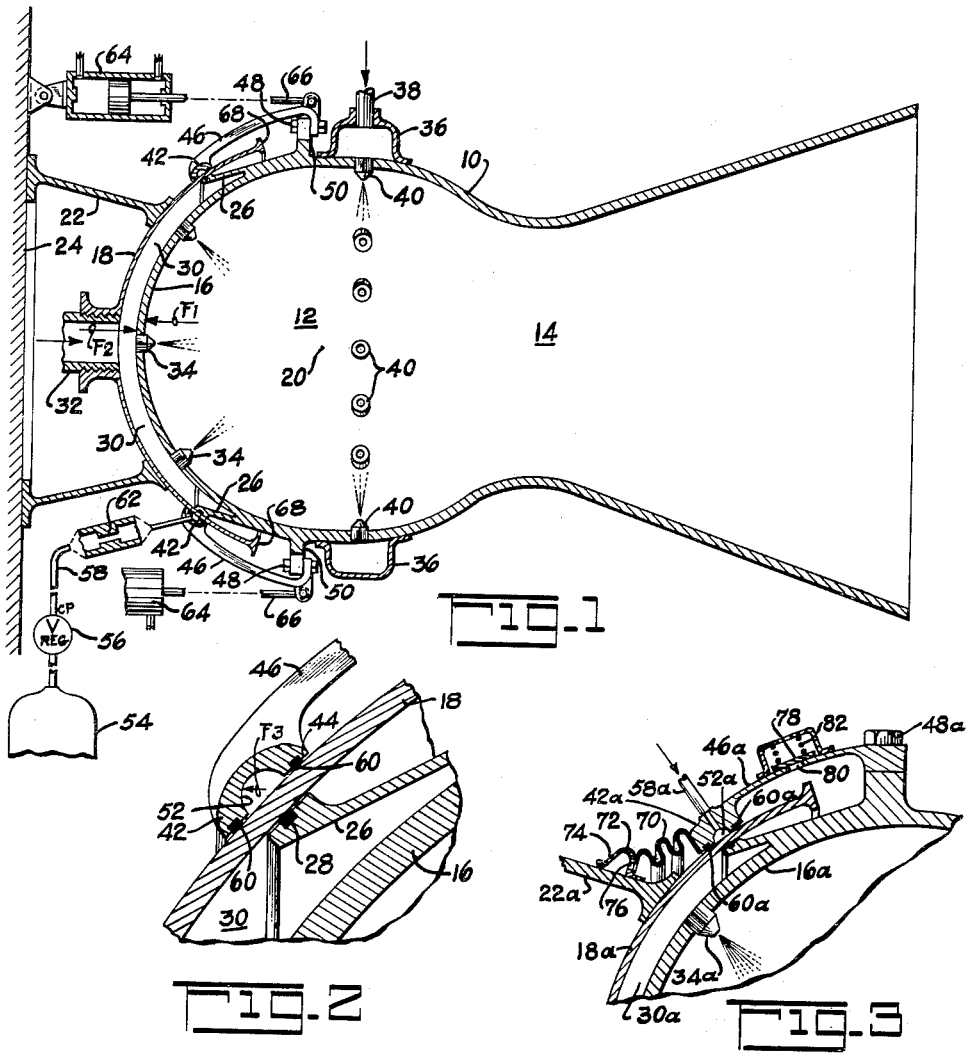
INVENTORS
EDWARD A. NEU, JR.
MARVIN STERNBERG
BY *Victor D. Behn*
ATTORNEY

United States Patent Office 3,016,697
Patented Jan. 16, 1962

3,016,697
ROCKET ENGINE SWIVEL MOUNT
Marvin Sternberg, Hillsdale, N.J., and Edward A. Neu, Jr., Canoga Park, Calif., assignors to Curtiss-Wright Corporation, a corporation of Delaware
Filed June 19, 1959, Ser. No. 821,572
12 Claims. (Cl. 60—35.6)

This invention relates to rockets and is particularly directed to a swivel mount structure for a rocket engine using fluid fuel propellants as distinct from a solid fuel propellant. The rocket may have a mono-propellant fuel system or a multi-propellant fuel system.

Control of the direction of flight of rocket propelled aircraft including missiles can be accomplished by swiveling adjustment of the rocket casing to change the orientation of the axis of the rocket nozzle relative to the aircraft. As used herein the term aircraft is intended to include missiles. An object to this invention comprises the provision of a novel swivel-type mount for the thrust chamber casing of a rocket engine in which the weight, space and power requirements for the mount are held to a minimum. Thus for aircraft purposes the weight and space requirements of any such swivel mount structure for the thrust chamber casing of a rocket as well as the power required to adjust the orientation of said thrust chamber casing should be kept to a minimum.

A further object of the invention comprises the provision of a novel swivel-type rocket engine mount for its thrust chamber casing in which the pressure of a fluid fuel propellant of the rocket is utilized to minimize the forces on the bearing structure of the swivel mount. A still further object comprises the provision of such a swivel mount for a rocket thrust chamber casing in which a gas pressure is maintained between the fixed support member and the swivel bearing of the rocket thrust chamber casing to carry the bearing loads thereby minimizing frictional forces between said support and bearing.

Other objects of the invention will become apparent upon reading the annexed detail description in connection with the drawing in which:

FIG. 1 is a schematic axial sectional view of a rocket casing and swivel mount structure embodying the invention;

FIG. 2 is an enlarged view of a portion of FIG. 1; and

FIG. 3 is a partial view illustrating a modification of the invention.

Referring first to FIGS. 1 and 2 of the drawing, reference numeral 10 designates the thrust chamber casing structure of a rocket engine, said casing having a combustion chamber 12 and a nozzle 14 through which the rocket motive fluid discharges with resulting rocket engine thrust.

The rocket engine may be supplied with any suitable fluid propellant or propellants for combustion in the chamber 12. As illustrated, the rocket engine has a bipropellant fuel system. For example, liquid oxygen and a hydrocarbon fuel may be the fluids used for combustion or heat release in the chamber 12. Any such fluid is herein termed a "combustion fluid."

The closed end 16 of the rocket thrust chamber casing 10 is disposed adjacent to but spaced from the concave side of a spherical support member 18. The spherical support member 18 is a segment of a hollow sphere, said segment being less than a semi-circle whereby the closed end of the rocket thrust chamber 10 can, as illustrated, be placed close to the spherical support member with the center 20 of said spherical member disposed well within the casing 10. As illustrated, the closed end 16 of the rocket casing 10 preferably is also spherical to permit close spacing of said support member and casing. The spherical support member 18 is connected by a thrust mount drum structure 22 to a fixed wall structure 24. In the case of an aircraft provided with the rocket 10 for propulsion, the wall structure 24 would be connected to part of the fixed structure of the aircraft.

The closed end of the rocket casing has a co-axial annular flange 26 extending toward the spherical support member 18 and having an annular seal ring 28 at its end engaging the spherical support member 18. A sealed space 30 is thereby formed between the spherical support member and the closed end 16 of the rocket casing.

A combustion fluid for the rocket is supplied under pressure to the space 30 by a supply conduit 32. From the space 30 said combustion fluid discharges into the combustion chamber 12 through nozzles 34. Thus the space 30 constitutes a manifold for the rocket combustion fluid supplied by the conduit 32.

As illustrated, the diameter of the annular flange 26 is smaller at its outer or spherical support member end whereby the pressure of the fluid within the manifold space 30 is effective to urge said flange and its seal ring 28 into contact with the spherical support member 18. For this purpose the flange 26 is provided with the necessary degree of flexibility.

The rocket may be supplied with a mono-propellant type fuel in which case the fluid supplied by the conduit 32 would be the sole fuel supplied to the rocket combustion chamber 12. In the more usual case, however, two fluids such as liquid oxygen and a hydrocarbon fuel are brought together in the combustion chamber 12 for combustion therein. For this purpose a second combustion fluid manifold 36 is provided, said manifold being annular and being secured to and about the rocket casing 10. The second combustion fluid is supplied under pressure to the manifold 36 by a supply conduit 38 and from said manifold the fluid discharges into the combustion chamber 12 through nozzles 40.

As is quite common in rocket engines, suitable heat exchange passages (not shown) may be provided along the entire wall of the combustion chamber and nozzle portions of the casing 10 for circulation therethrough of fluid from the manifold 36 before said fluid discharges through the nozzles 40 into the combustion chamber 12. With such an arrangement and with liquid oxygen and a hydrocarbon fuel as the two combustion fluids, the hydrocarbon fuel would be circulated through said heat exchange passages for regenerative type cooling.

The two fluids supplied by the nozzles 34 and 40 mix and burn within the combustion chamber 12. Suitable ignition means (not shown) may be required to initiate combustion. The combustion gases resulting from said combustion comprise the rocket motive fluid, said gases discharging through the nozzle 14 to provide the rocket with propulsive thrust. Thus the pressure of the gases within the rocket combustion chamber 12 and nozzle 14 exerts a net force F1 on the rocket casing to the left, as viewed in FIG. 1.

This net thrust force F1 on the rocket casing is opposed by the pressure of the combustion fluid in the manifold 30. Obviously, in order for the combustion fluid in the manifold 30 to discharge into the chamber 12 through the nozzles 34, said fluid must be supplied to the manifold 30 under a pressure in excess of the resulting pressure in the combustion chamber 12. The effective area of the closed end 16 of the rocket casing 10 against which the combustion fluid in the manifold 30 acts is made sufficiently large so that the net force F2 exerted (to the right FIG. 1) by this pressure against the rocket casing 10 is greater than the opposing thrust force F1 of the rocket motive fluid under all operating conditions for which the rocket is designed. That is F2 is always greater than F1.

As used herein, the "effective area" of a surface against which a fluid pressure acts is the area of the projection of said surface on a plane disposed at right angles to the resultant or net fluid pressure force on said surface.

The rocket casing 10 is supported by the spherical support member 18 against the unbalance of the forces F1 and F2. For this purpose an annular bearing member 42 is provided, said bearing member overlying the spherical support member on the side of said support member remote from the rocket casing and having a spherical surface 44 fitted to the facing spherical surface of the support member 18. The bearing member 42 is provided with a plurality of circumferentially-spaced arms 46 which extend over the spherical support member 18. The arms 46 are secured by bolts 48 to lugs 50 on the rocket casing 10. With this construction the member 42 provides a bearing structure which supports the casing 10 on the spherical support member 18 against unbalance of the forces F1 and F2.

In order to provide for ease of adjustment of the rocket casing 10 on the spherical support member 18, the annular bearing member 42 is provided with an annular channel 52 opening through its spherical surface 44 so that the open face of said channel faces the spherical support member 18. In addition, as shown the two sides of the annular channel are spaced from the edges of the surface 44 through which said channel opens. A gas, preferable inert to the rocket combustion fluids, for example nitrogen, is supplied under pressure to the chamber 52. For this purpose a sealed container 54 of nitrogen under high pressure is connected through a pressure regulating valve 56 and passage 58 to the channel 52. Suitable seal rings 60 are provided on both sides of the channel 52 to minimize leakage of gas from the channel 52 between the bearing surface 44 and the support member 18. At this point it should be noted that the seals 60 provide an annular chamber therebetween of which the channel 52 is a part. The channel 52 is not necessary except to help distribute said nitrogen gas around said annular chamber of the bearing member 42. With this arrangement the gas pressure in said annular chamber including the channel 52 exerts a net force F3 (FIG. 2) to the left on the bearing member 42, this force being transmitted to the rocket casing 10 by the arms 46 and opposing the unbalance of the forces F1 and F2 on said casing. The pressure of the gas supplied to the channel 52 and the effective cross-sectional area of said channel are made sufficiently large so that in the absence of gas leakage from the channel 52 the gas pressure therein would be capable of providing a force F3 substantially in excess of that required to balance the forces F1 and F2.

The pressure in the channel 52 is automatically throttled to the point at which the force F3 substantially balances F1 and F2. For this purpose a restriction 62 is provided in the passage 58 so that any leakage flow of gas from the channel 52 past the seals 60 results in a reduction in the gas pressure in the channel 52. Obviously the passage 58 itself may constitute the restriction 62. If the force F3 should become greater than that required to balance the forces F1 and F2 then the force F3 will in effect lift the bearing member 42 slightly from the support member 18 by shifting the rocket casing 10 to the left (FIG. 1) relative to said support member thereby increasing the gas leakage past the seals 60 until the forces F1, F2 and F3 are in balance. Likewise, if the force F3 should become too small to balance F1 and F2 the unbalance of the forces F1 and F2 will shift the rocket casing 10 slightly to the right to decrease the leakage past the seals 60 until the forces F1, F2 and F3 are again in balance. In this way the lift of the bearing member 42 off the support member 18 automatically varies to regulate the gas pressure in the channel 52 so that the forces F1, F2 and F3 are maintained substantially in balance. In view of the large leakage area for escape of gas from the channel 52 the actual change in the magnitude of the lift of the bearing member 52 off the support member 18 is quite small. The seal flange 26 on the other side of the support member 18 is provided with sufficient flexibility to accommodate this lift movement of the bearing member 42 off the support surface 18.

With gas leakage from the channel 52 across the bearing surface 44, a continuous film of gas is provided between the bearing member 42 and the spherical support member 18 thereby minimizing frictional resistance to swiveling adjustment of the rocket casing 10 on the said member. The power required to effect such swiveling adjustment is thereby minimized. One or more actuators, such as fluid motors 64, are connected to the rocket casing 10 by piston rods 66 for effecting swiveling adjustment of the rocket casing 10 in any desired direction about the spherical support member 18.

As illustrated in FIG. 1 one pair of such actuators 64 are provided on diametrically opposite sides of the rocket casing 10. With this arrangement, extension of one of these actuators and retraction of the other will serve to swively adjust the rocket casing in the plane of FIG. 1. A second diametrically opposed pair of actuators (not shown) and displaced 90° from the first pair are similarly connected to the rocket casing whereby extension and retraction of these latter two actuators will serve to adjust the rocket casing in a plane at right angles to the plane of FIG. 1 and including the rocket axis in its undisplaced position. With two such pairs of actuators the rocket casing 10 can be swively adjusted in all directions. It should be noted, however, that the invention is not limited to any particular arrangement or construction of the actuator motors for swiveling the rocket thrust chamber casing 10.

As previously noted the center of the spherical support member 18 is at 20 within the rocket casing. Hence, the center of the swiveling adjustment can be placed not too far from the center of gravity of the rocket casing 10. This further serves to reduce the power required of the motor 64 for swively adjusting the rocket casing 10.

As illustrated the flange 26 and its seal 28 preferably engage the surface of the spherical support member at a point opposite to the channel 52 of the bearing member 42. In this way said flange 26 and its seal 28 provide a back up for the support member thereby minimizing any distortion of said support member of the gas pressure in the channel 52.

The range of swiveling adjustment of the rocket casing 10 is limited by contact of the bearing member 42 with an end flange 68 on the support member 18 and by the supporting drum 22. Hence, only the portion of the spherical support member 18 between the drum 22 and the end flange 68 need be spherical. Also the closed end 16 of the rocket casing need not be spherical as illustrated.

The spherical support member 18 and associated structure provides for universal adjustment of the rocket casing 10 about its center 20. Obviously the spherical supporting structure illustrated could be used even if swiveling adjustment in only one plane were desired. In this latter case the cooperating surface of the support member 18 and bearing member 42 could if desired be made cylindrical instead of spherical. However, even in the case of swivel adjustment in only one plane a spherical support member is preferred to a cylindrical support member for reasons of stress.

Where a cryogenic combustion fluid, such as liquid oxygen, is supplied by the conduit 32 to the sealed space or manifold 30 there is danger of ice forming on the spherical support member 18. Any such icing might prevent swivel adjustment of the rocket casing along said spherical support member 18. Such icing may be avoided if moisture is kept away from the support member 18. An arrangement for this purpose is illustrated in FIG. 3.

For ease of understanding, those parts of FIG. 3 corresponding to parts of FIGS. 1 and 2 have been designated by the same reference numerals but with a subscript *a* added thereto.

In FIG. 3 the arms 46 connecting the bearing member to the rocket casing have been replaced by an annular shell 46a. In addition, an annular bellows 70 extends from the inner side of the bearing member 42a to the thrust mount drum structure 22a. With this arrangement, the portion of the spherical support member 18a along which the bearing member 42a is movable is isolated or shielded from contact with the surrounding air whereby danger of ice formation on the support member 18a is minimized.

The connection between the bellows 70 and the drum 22a includes a bracket 72 having a flexible leg 74 resiliently urged lightly against said drum to function as a pressure relief valve. The nitrogen supplied to the annular groove 52a by the supply passage 58a and leaking past the lower seal ring 60a escapes through openings 76 in the bracket 72 and past the flexible leg 74 by raising said leg from the drum 22a. Provision is also made for the escape of the nitrogen leaking past the upper seal ring 60a. For this purpose a pressure relief valve 78 is mounted on the shell 46a to permit the escape of said gas through an opening 80 in said shell. A light spring 82 serves to hold the valve 78 in its closed position. In this way said nitrogen, in cooperation with the shell 46a and bellows 70, serves to shield the portion of the spherical support member 18a, over which the bearing 42a is movable, from contact with the surrounding atmosphere. Obviously, the gas supplied by the passage 58a to the annular groove 52a should be relatively free of moisture.

This arrangement of FIG. 3 is otherwise like that of FIGS. 1 and 2 and therefore no further description of FIG. 3 appears necessary.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with the thrust chamber casing of a rocket engine having a nozzle opening through which the rocket motive fluid discharges; a structure for providing a swivel mount for said rocket casing comprising a support member having a circular cross-section and having its concave side disposed adjacent to but spaced from the closed end of said rocket casing; seal means enclosing the space between said support member and said closed end of the rocket casing; means for supplying a rocket combustion fluid under pressure to said space so that the fluid in said space exerts a force on said rocket casing in opposition to the force exerted on said casing by the rocket motive fluid therein during rocket engine operation, the effective area of the portion of said closed end of the rocket casing bounding said space being such that during rocket operation said combustion fluid force is different in magnitude than said opposing rocket motive fluid force; and bearing means secured to said rocket casing and cooperating with said support member for supporting the rocket casing against unbalance of said forces to permit swiveling adjustment of said rocket casing on said support member about the center of the circular cross-section of said support member.

2. In combination with the thrust chamber casing of a rocket engine having a nozzle opening through which the rocket motive fluid discharges; a structure for providing a swivel mount for said rocket casing comprising a support member having a circular cross-section and having its concave side disposed adjacent to but spaced from the closed end of said rocket casing; seal means enclosing the space between said support member and said closed end of the rocket casing; means for supplying a rocket combustion fluid under pressure to said space for discharge therefrom into the rocket casing for combustion therein, the fluid in said space exerting a force on said rocket casing in opposition to the force exerted on said casing by the rocket motive fluid during rocket engine operation and the effective area of the portion of said closed end of the rocket casing bounding said space being such that during rocket engine operation said combustion fluid force is different in magnitude than said opposing rocket motive fluid force; bearing means secured to said rocket casing and cooperating with said support member for supporting the rocket casing against unbalance of said forces to permit swiveling adjustment of said rocket casing on said circular support member about the center of the circular cross-section of said support member; and means causing flow of a fluid under pressure outwardly from between said bearing means and said support member.

3. In combination with the thrust chamber casing of a rocket engine having a nozzle opening through which the rocket motive fluid discharges; a structure for providing a swivel mount for said rocket casing comprising a spherical support member having concave side disposed adjacent to but spaced from the closed end of said rocket casing; means providing an annular seal enclosing the space between said support member and said closed end of the rocket casing; means for supplying a rocket combustion fluid under pressure to said space so that the fluid in said space exerts a force on said rocket casing in opposition to the force exerted on said casing by the rocket motive fluid therein during rocket operation, the effective area of the portion of said closed end of the rocket casing bounding said space being such that during rocket operation said combustion fluid force is greater than said opposing rocket motive fluid force; and bearing means secured to said rocket casing and cooperating with the convex side of said spherical support member for supporting the rocket casing against unbalance of said forces and permitting swiveling adjustment of said rocket casing on said spherical support member.

4. The combination recited in claim 3 in which the surface of said seal means exposed to the pressure within said space subjects the seal to a force which increases the seal effectiveness.

5. The combination recited in claim 3 in which said seal means engages the spherical support member directly opposite to said bearing means.

6. The combination recited in claim 3 and including means for shielding from the surrounding atmosphere at least the portion of the convex side of said spherical support member cooperating with said bearing means.

7. In combination with the thrust chamber casing of a rocket engine having a nozzle opening through which the rocket motive fluid discharges; a structure for providing a swivel mount for said rocket casing comprising a spherical support member having concave side disposed adjacent to but spaced from the closed end of said rocket casing; means providing an annular seal enclosing the space between said support member and said closed end of the rocket casing; means for supplying a rocket combustion fluid under pressure to said space so that the fluid in said space exerts a force on said rocket casing in opposition to the force exerted on said casing by the rocket motive fluid therein during rocket operation, the effective area of the portion of said closed end of the rocket casing bounding said space being such that during rocket operation said combustion fluid force is greater than said opposing rocket motive fluid force; bearing means secured to said rocket casing and cooperating with the convex side of said spherical support member for supporting the rocket casing against unbalance of said forces and permitting swiveling adjustment of said rocket casing on said spherical support member; and means including a passage for supplying a fluid under pressure to said bearing means such that it flows between said spherical member and the facing surface of said bearing means from a region on said surface disposed inwardly of the periphery of said surface.

8. The combination recited in claim 7 and including means utilizing the last-mentioned fluid for shielding from the surrounding atmosphere at least the portion of the convex side of said spherical support member cooperating with said bearing means.

9. In combination with the thrust chamber casing of a rocket engine having a nozzle opening through which the rocket motive fluid discharges; a structure for providing a swivel mount for said rocket casing comprising a spherical support member having concave side disposed adjacent to but spaced from the closed end of said rocket casing; means providing an annular seal enclosing the space between said support member and said closed end of the rocket casing; means for supplying a rocket combustion fluid under pressure to said space so that the fluid in said space exerts a force on said rocket casing in opposition to the force exerted on said casing by the rocket motive fluid therein during rocket operation, the effective area of the portion of said closed end of the rocket casing bounding said space being such that during rocket operation said combustion fluid force is greater than said opposing rocket motive fluid force; bearing means secured to said rocket casing and cooperating with the convex side of said spherical support member for supporting the rocket casing against unbalance of said forces and permitting swiveling adjustment of said rocket casing on said spherical support member, said bearing means having a chamber with an open side facing said spherical member such that said open side is substantially closed by said spherical member; and means including a passage for supplying a fluid under pressure to said chamber for exerting a force against the bottom of said chamber which is in substantially the same direction as said rocket motive fluid force against the rocket casing.

10. In combination with the thrust chamber casing of a rocket engine having a nozzle opening through which the rocket motive fluid discharges; a structure for providing a swivel mount for said rocket casing comprising a spherical support member having concave side disposed adjacent to but spaced from the closed end of said rocket casing; means providing an annular seal enclosing the space between said support member and said closed end of the rocket casing; means for supplying a rocket combustion fluid under pressure to said space for discharge therefrom into the rocket casing for combustion therein, the fluid in said space exerting a force on said rocket casing in opposition to the force exerted on said casing by the rocket motive fluid therein during rocket engine operation and the effective area of the portion of said closed end of the rocket casing bounding said space being such that during rocket operation said combustion fluid force is greater than said opposing rocket motive fluid force; bearing means secured to said rocket casing and cooperating with the convex side of said spherical support member for supporting the rocket casing against unbalance of said forces and permitting swiveling adjustment of said rocket casing on said spherical support member, said bearing means having an annular chamber with an open side facing said spherical member such that said open side is substantially closed by said spherical member; and means including a restricted fluid passage for supplying a fluid under pressure to said chamber for exerting a force against the bottom of said chamber which is in substantially the same direction as said rocket motive fluid force against the rocket casing, the pressure of the fluid supplied to said chamber through said passage being in excess of that required to balance said forces and there being sufficient flexibility in the rocket casing mounting structure that said excess pressure is effective to lift said bearing means off said spherical member to provide a fluid leakage path from said chamber such that the pressure in said chamber is automatically reduced to the point at which the pressure in said chamber substantially balances said forces.

11. The combination recited in claim 10 in which said seal means engages the spherical support member directly opposite to said bearing means and the pressure of the combustion fluid within said space urges said seal means into sealing contact with said spherical support member.

12. The combination recited in claim 11 and including means utilizing the fluid leaking from said bearing means for shielding, from the surrounding atmosphere, at least the portion of the convex side of said spherical support member cooperating with said bearing means.

References Cited in the file of this patent
UNITED STATES PATENTS

| | | |
|---|---|---|
| 2,621,871 | Robert | Dec. 16, 1952 |
| 2,639,582 | Pearlman | May 26, 1953 |